(12) United States Patent
Willi et al.

(10) Patent No.: US 8,113,173 B2
(45) Date of Patent: Feb. 14, 2012

(54) ENGINE CONTROL SYSTEM HAVING SPEED-BASED TIMING

(75) Inventors: Martin L. Willi, Dunlap, IL (US); Scott B. Fiveland, Metamora, IL (US); David T. Montgomery, Edelstein, IL (US); Weidong Gong, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 201 days.

(21) Appl. No.: 12/292,822

(22) Filed: Nov. 26, 2008

(65) Prior Publication Data
US 2010/0126463 A1 May 27, 2010

(51) Int. Cl.
*F02M 7/00* (2006.01)

(52) U.S. Cl. ......... 123/436; 123/687; 123/347; 701/103

(58) Field of Classification Search .................. 123/321, 123/322, 347, 348, 90.15, 434, 436, 687; 701/103
See application file for complete search history.

(56) References Cited

U.S. PATENT DOCUMENTS

| | | |
|---|---|---|
| 5,027,769 A | 7/1991 | Yoshida et al. |
| 5,168,954 A | 12/1992 | Nakaniwa et al. |
| 5,325,829 A | 7/1994 | Iwasiuk |
| 5,623,909 A | 4/1997 | Wertheimer |
| 5,765,532 A | 6/1998 | Loye |
| 5,806,490 A | 9/1998 | Nogi et al. |
| 5,878,717 A | 3/1999 | Zur Loye |
| 6,000,384 A | 12/1999 | Brown et al. |
| 6,276,316 B1 * | 8/2001 | Arai et al. .................. 123/90.11 |
| 6,276,334 B1 | 8/2001 | Flynn et al. |
| 6,286,482 B1 | 9/2001 | Flynn et al. |
| 6,308,671 B1 * | 10/2001 | Reed et al. .................. 123/90.15 |
| 6,354,268 B1 | 3/2002 | Beck et al. |
| 6,371,092 B1 | 4/2002 | Guglielmo et al. |
| 6,397,814 B1 | 6/2002 | Nagaishi et al. |
| 6,651,618 B1 | 11/2003 | Coleman et al. |
| 6,732,685 B2 | 5/2004 | Leman |
| 6,799,552 B2 | 10/2004 | Crowell et al. |
| 6,843,231 B1 | 1/2005 | Duffy et al. |
| 6,882,929 B2 | 4/2005 | Liang et al. |
| 6,935,287 B2 | 8/2005 | Shinogle |
| 6,941,909 B2 | 9/2005 | Robel et al. |
| 6,973,901 B2 * | 12/2005 | Machida ..................... 123/90.16 |

(Continued)

FOREIGN PATENT DOCUMENTS

EP 0 945 606 A2 9/1999

(Continued)

OTHER PUBLICATIONS

"Throttleless engines—BMW Valvetronic" posted at http://www.autozine.org/technical_school/petrol2.htm (available Feb. 15, 2005).

(Continued)

*Primary Examiner* — John Kwon

(57) ABSTRACT

A control system for an engine having a cylinder is disclosed having an engine valve movable to regulate a fluid flow of the cylinder and an actuator associated with the engine valve. The control system also has a controller in communication with the actuator. The controller is configured to receive a signal indicative of engine speed and compare the engine speed signal with a desired engine speed. The controller is also configured to selectively regulate the actuator to adjust a timing of the engine valve to control an amount of air/fuel mixture delivered to the cylinder based on the comparison.

20 Claims, 3 Drawing Sheets

U.S. PATENT DOCUMENTS

| | | |
|---|---|---|
| 6,976,459 B2 | 12/2005 | Kagy et al. |
| 6,986,330 B2 | 1/2006 | Fuwa et al. |
| 7,000,596 B2 | 2/2006 | Zurloye et al. |
| 7,055,492 B2 | 6/2006 | Yamaoka et al. |
| 7,066,142 B2 | 6/2006 | Hanasato |
| 7,073,485 B2 | 7/2006 | Truscott et al. |
| 7,080,615 B2 | 7/2006 | Shinogle |
| 7,131,416 B2 | 11/2006 | Sasaki et al. |
| 7,152,559 B2 | 12/2006 | Kuo et al. |
| 7,156,070 B2 | 1/2007 | Strom et al. |
| 7,178,491 B2 | 2/2007 | Chang |
| 7,201,121 B2 | 4/2007 | Weber et al. |
| 7,210,457 B2 | 5/2007 | Kuzuyama |
| 7,213,553 B2 | 5/2007 | Kalish et al. |
| 7,228,828 B2 | 6/2007 | Kagy et al. |
| 7,295,912 B2 | 11/2007 | Yasui et al. |
| 7,325,529 B2 | 2/2008 | Ancimer et al. |
| 7,331,317 B2 | 2/2008 | Yasui et al. |
| 7,334,549 B2 * | 2/2008 | Lewis et al. ............. 123/90.11 |
| 7,347,171 B2 | 3/2008 | Leman et al. |
| 7,367,318 B2 | 5/2008 | Moriya et al. |
| 7,367,921 B2 * | 5/2008 | Lewis ........................ 477/111 |
| 7,400,966 B2 | 7/2008 | Strom et al. |
| 7,532,972 B2 * | 5/2009 | Kolmanovsky et al. ...... 701/105 |
| 7,717,071 B2 * | 5/2010 | Lewis et al. ............. 123/90.11 |
| 7,743,747 B2 * | 6/2010 | Lewis et al. ............. 123/198 F |
| 7,827,946 B2 * | 11/2010 | Ishii et al. ................ 123/90.16 |
| 2002/0195086 A1 | 12/2002 | Beck et al. |
| 2003/0131812 A1 | 7/2003 | Hosoya |
| 2005/0039723 A1 | 2/2005 | Miura |
| 2005/0241597 A1 | 11/2005 | Weber et al. |
| 2005/0241613 A1 | 11/2005 | Weber et al. |
| 2005/0247286 A1 | 11/2005 | Weber et al. |
| 2006/0005802 A1 * | 1/2006 | Lewis et al. ............. 123/198 F |
| 2007/0062193 A1 | 3/2007 | Weber et al. |
| 2007/0089697 A1 | 4/2007 | Hara et al. |
| 2008/0035111 A1 | 2/2008 | Schmid et al. |
| 2010/0126465 A1 | 5/2010 | Willi et al. |
| 2010/0131172 A1 | 5/2010 | Willi et al. |

FOREIGN PATENT DOCUMENTS

| | | |
|---|---|---|
| EP | 1 772 608 A1 | 4/2007 |
| JP | 03011126 A | 1/1991 |
| JP | 03151518 A | 6/1991 |
| JP | 06108884 A | 4/1994 |
| JP | 06323115 | 11/1994 |
| JP | 09250379 A | 9/1997 |
| JP | 2002285913 A | 10/2002 |
| JP | 2006188952 A | 7/2006 |
| WO | 2008075704 | 6/2008 |

OTHER PUBLICATIONS

"2008 Volkswagen Touareg BlueTDI" posted at http://www.supercarnews.net/2008-volkswagen-tuareg-blue-tdi" (available Jul. 4, 2007).

* cited by examiner

ENGINE CONTROL SYSTEM HAVING SPEED-BASED TIMING

STATEMENT OF GOVERNMENT INTEREST

This invention was made with Government support under Contract No. DE-FC02-01CH11079, awarded by the Department of Energy. The Government may have certain rights in this invention.

TECHNICAL FIELD

The present disclosure is directed to an engine control system and, more particularly, to an engine control system having speed-based timing.

BACKGROUND

Combustion engines are often used for power generation applications. These engines can be gaseous-fuel driven and implement lean burn, during which air/fuel ratios are higher than in conventional engines. For example, these gas engines can admit about 75% more air than is theoretically needed for stoichiometric combustion. Lean-burn engines increase fuel efficiency because they utilize homogeneous mixing to burn less fuel than a conventional engine and produce the same power output.

Though using lean burn may increase efficiency, gaseous fuel-powered engines may be limited by variations in combustion pressures between cylinders of the engine. Gaseous fuel-powered engines are typically pre-mix charge engines, where fuel and air are mixed within an intake manifold and then admitted to a combustion chamber of the engine. Variations in combustion pressure result from more air/fuel mixture being admitted into some cylinders than into other cylinders. This uneven distribution of the air/fuel mixture can result in pockets of the air/fuel mixture burning outside of the envelope of normal combustion, increasing the tendency for an engine to knock. The combustion pressure variations can result in cylinder pressures that are significantly higher than average peak cylinder pressures normally seen within the engine. And, because significantly higher cylinder pressures can cause the engine to operate improperly, a margin of error is required to accommodate the pressure variations. As a result, the engine may be required to operate at a level far enough below its load limit to compensate for the pressure variation between the cylinders, thereby lowering the load rating of the engine. Additionally, the pressure variations can cause fluctuation in engine torque and speed, which may be undesirable for some electrical power generation applications.

One attempt to reduce pressure variations within an engine is described in U.S. Pat. No. 5,027,769 (the '769 patent), issued to Yoshida et al. The '769 patent discloses an engine system having an air intake. The intake includes multiple intake passages, each intake passage including a throttle valve. The '769 patent also discloses a control apparatus and a sensing device for detecting abnormalities in throttle valve operation. The control apparatus adjusts the operation of the throttle valves based on input from the sensing device, thereby adjusting an amount of air/fuel mixture delivered to the engine. By this adjustment, an appropriate amount of air/fuel mixture may be delivered to the engine, thereby maintaining a desired combustion pressure despite the occurrence of abnormalities in one of the multiple intake passages.

Although the control apparatus of the '769 patent may control a plurality of throttle valves based on sensed data relating to abnormal operation, the apparatus may incur a lag time between adjustment of the throttle valves and a corresponding change in the amount of the air/fuel mixture delivered to the cylinders. The lag time may occur because it takes an amount of time such as, for example, about 3-5 seconds between adjusting a throttle valve and a corresponding change in combustion pressure to occur within the cylinders. The lag time may reduce the responsiveness of the engine to engine speed adjustments, which may be undesirable for operation.

The present disclosure is directed to overcoming one or more of the shortcomings set forth above and/or other deficiencies in existing technology.

SUMMARY OF THE DISCLOSURE

In accordance with one aspect, the present disclosure is directed toward a control system for an engine having a cylinder. The control system includes an engine valve movable to regulate a fluid flow of the cylinder and an actuator associated with the engine valve. The control system also includes a controller in communication with the actuator. The controller is configured to receive a signal indicative of engine speed and compare the engine speed signal with a desired engine speed. The controller is also configured to selectively regulate the actuator to adjust a timing of the engine valve to control an amount of air/fuel mixture delivered to the cylinder based on the comparison.

According to another aspect, the present disclosure is directed toward a method for operating an engine. The method includes regulating a fluid flow to a cylinder of the engine via a valve associated with the cylinder and receiving a signal indicative of engine speed. The method also includes comparing the engine speed signal with a desired engine speed and selectively regulating a timing of the valve to control an amount of air/fuel mixture delivered to the cylinder based on the comparison.

DETAILED DESCRIPTION

Figure 1:
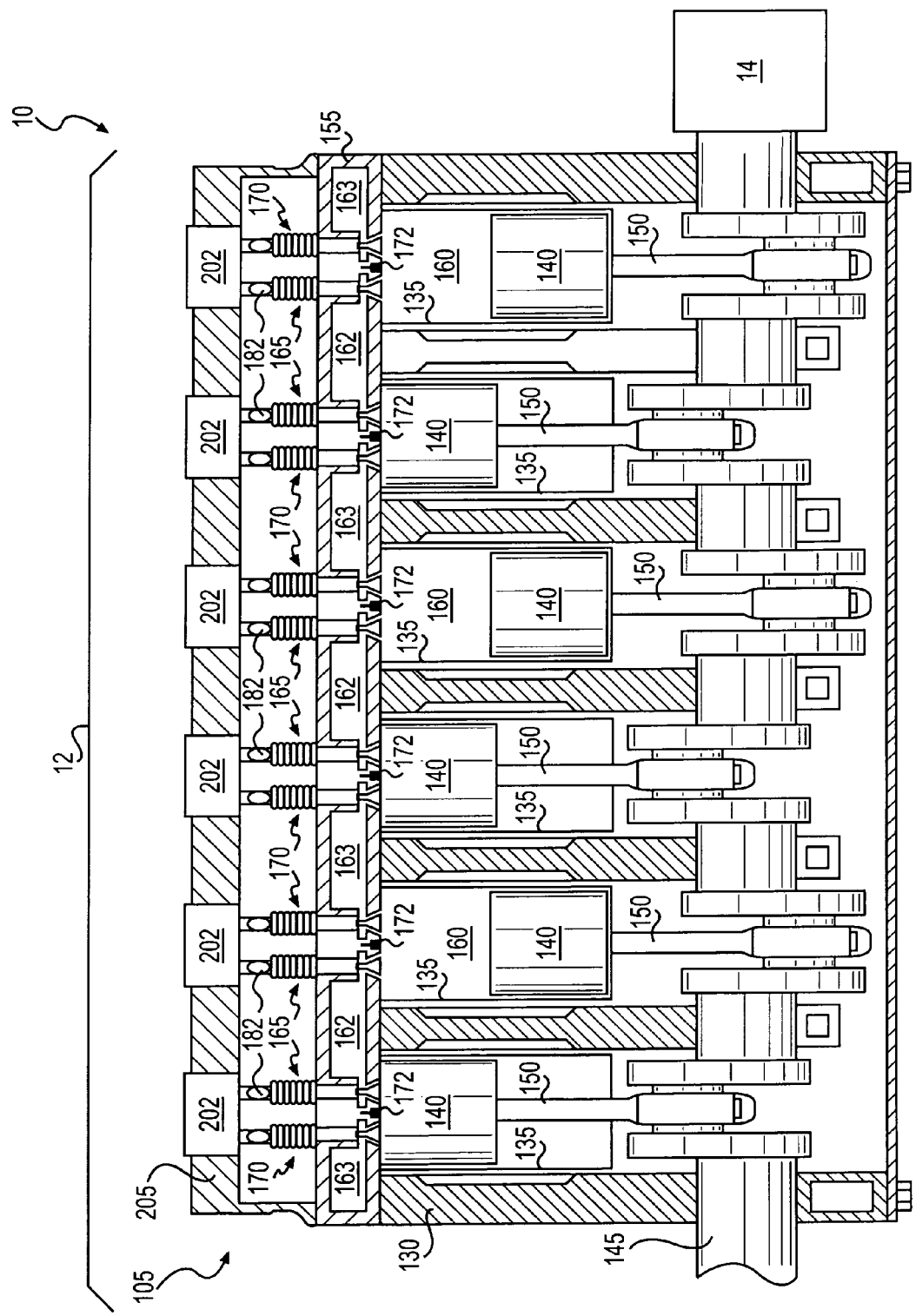
FIG. 1 is a pictorial illustration of an exemplary disclosed generator set.

FIG. 1 illustrates a generator set (genset) 10 having a prime mover 12 coupled to mechanically rotate a generator 14 that provides electrical power to an external load (not shown). Generator 14 may be, for example, an AC induction generator, a permanent-magnet generator, an AC synchronous generator, or a switched-reluctance generator. In one embodiment, generator 14 may include multiple pairings of poles (not shown), each pairing having three phases arranged on a circumference of a stator (not shown) to produce an alternating current with a frequency of about 50 and/or 60 Hz. Electrical power produced by generator 14 may be directed for offboard purposes to the external load.

Figure 2:
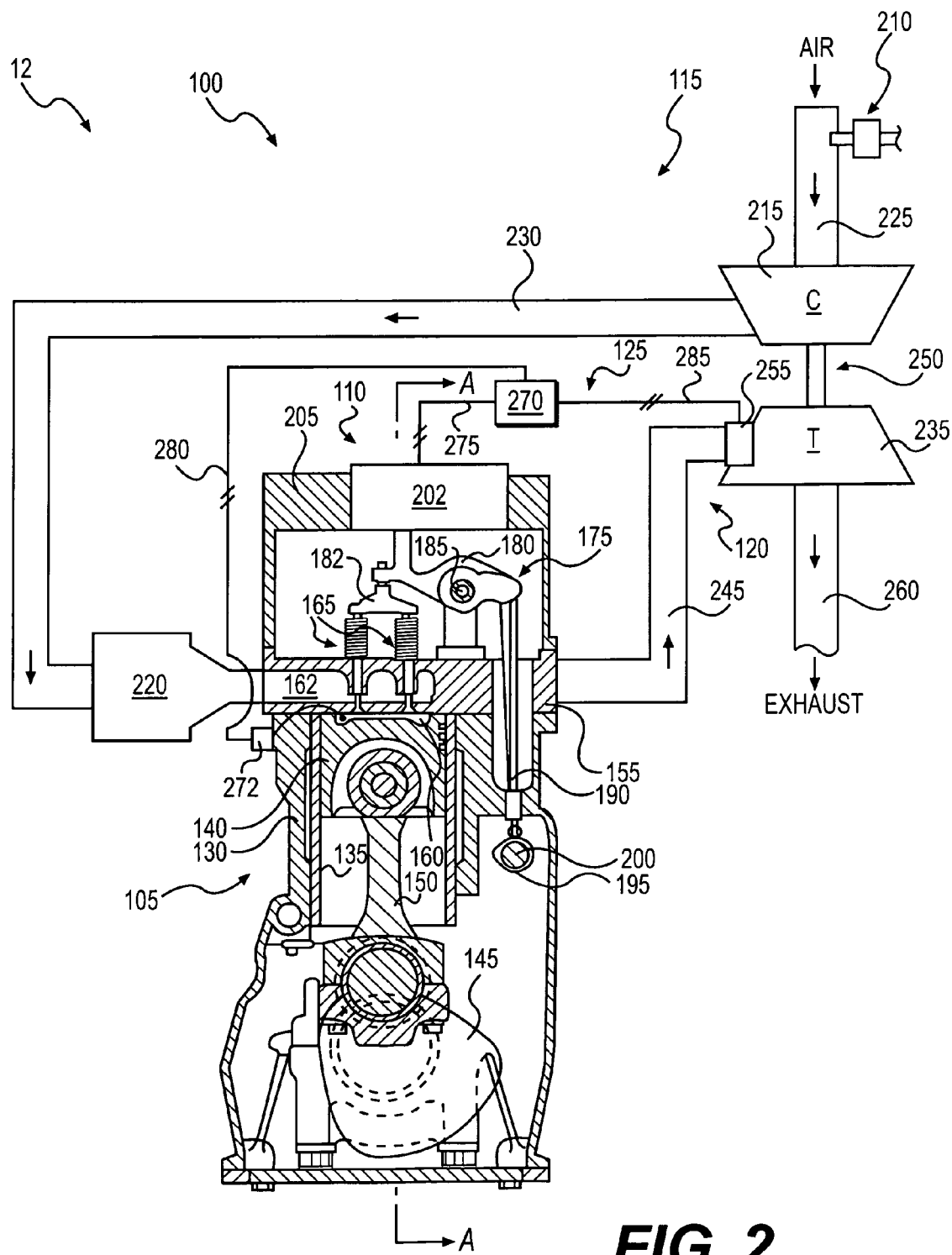
FIG. 2 is a schematic illustration of an exemplary disclosed engine system associated with the generator set of FIG. 1.

Prime mover 12 may include an engine system 100, as illustrated in FIG. 2. Engine system 100 may include an engine 105, a variable valve actuation system 110, an intake system 115, an exhaust system 120, and a control system 125. Intake system 115 may deliver air and/or fuel to engine 105, while exhaust system 120 may direct combustion gases from engine 105 to the atmosphere. Variable valve actuation system 110 may vary a valve timing of engine 105 to affect fluid flow of engine 105. Control system 125 may control an operation of variable valve actuation system 110, intake system 115, and/or exhaust system 120.

Engine 105 may be a four-stroke diesel, gasoline, or gaseous fuel-powered engine. As such, engine 105 may include an engine block 130 at least partially defining a plurality of cylinders 135 (only one shown in FIG. 2). In the illustrated embodiment of FIG. 1, engine 105 is shown to include six cylinders 135. However, it is contemplated that engine 105 may include a greater or lesser number of cylinders 135 and that cylinders 135 may be disposed in an "in-line" configuration, a "V" configuration, or in any other suitable configuration.

A piston 140 may be slidably disposed within each cylinder 135, so as to reciprocate between a top-dead-center (TDC) position and a bottom-dead-center (BDC) position during an intake stroke, a compression stroke, a combustion or power stroke, and an exhaust stroke. Returning to FIG. 2, pistons 140 may be operatively connected to a crankshaft 145 via a plurality of connecting rods 150. Crankshaft 145 may be rotatably disposed within engine block 130, and connecting rods 150 may connect each piston 140 to crankshaft 145 so that a reciprocating motion of each piston 140 results in a rotation of crankshaft 145. Similarly, a rotation of crankshaft 145 may result in a sliding motion of each piston 140 between the TDC and BDC positions. As shown in the lower portion of the graph of FIG. 3, piston 140 may move through the intake stroke from the TDC position (crank angle of about 0 degrees) to the BDC position (crank angle of about 180 degrees) to draw air and/or fuel into the respective cylinder 135. Piston 140 may then return to the TDC position (crank angle of about 360 degrees), thereby compressing the air/fuel mixture during the compression stroke. The compressed air/fuel mixture may ignite, causing piston 140 to move back to the BDC position (crank angle of about 540 degrees) during the power stroke. Piston 140 may then return to the TDC position (crank angle of about 720 degrees) to push exhaust gas from cylinder 135 during the exhaust stroke.

One or more cylinder heads 155 may be connected to engine block 130 to form a plurality of combustion chambers 160. As shown in FIG. 1, cylinder head 155 may include a plurality of intake passages 162 and exhaust passages 163 integrally formed therein. One or more intake valves 165 may be associated with each cylinder 135 and movable to selectively inhibit flow between intake passages 162 and combustion chambers 160. One or more exhaust valves 170 may also be associated with each cylinder 135 and movable to selectively inhibit flow between combustion chambers 160 and exhaust passages 163. Additional engine components may be disposed in cylinder head 155 such as, for example, a plurality of sparkplugs 172 that ignite an air/fuel mixture in combustion chambers 160.

Engine 105 may include a plurality of valve actuation assemblies 175 that affect movement of intake valves 165 and/or exhaust valves 170 to help minimize engine knock. Each cylinder 135 may have an associated valve actuation assembly 175. Referring back to FIG. 2, each valve actuation assembly 175 may include a rocker arm 180 connected to move a pair of intake and/or exhaust valves 165, 170 via a bridge 182. Rocker arm 180 may be mounted to cylinder head 155 at a pivot point 185, and connected to a rotating camshaft 200 by way of a push rod 190. Camshaft 200 may be operatively driven by crankshaft 145, and may include a plurality of cams 195 that engage and move push rods 190.

Figure 3:
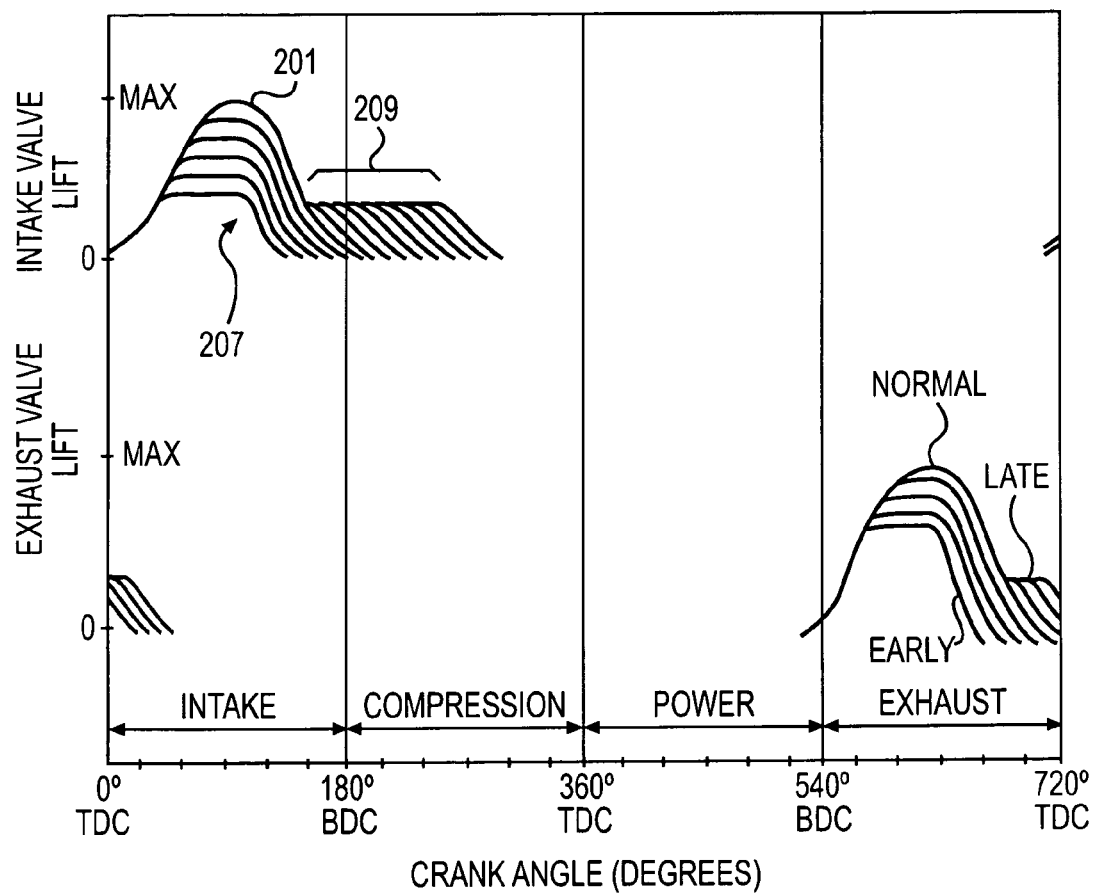
FIG. 3 is an exemplary disclosed graph associated with operation of the engine system of FIG. 2.

As pistons 140 move through the four stokes of the combustion cycle (i.e., intake, compression, power, and exhaust), crankshaft 145 may cyclically drive each valve actuation assembly 175 to move intake valves 165 and/or exhaust valves 170. As shown in FIG. 3, valve actuation assembly 175 may cause intake valves 165 to open during the intake stroke of piston 140. Actuation of intake valves 165 may generally follow profile 201 shown in the upper portion of the graph of FIG. 3. Intake valve 165 may open during the intake stroke, for example, at a crank angle of about 690° to about 0°, and may close at a crank angle of about 210°. Intake valves 165 may displace from a closed position to a maximum open position, during which the air/fuel mixture may be admitted into combustion chamber 160.

Varying a closing of intake valve 165 may change an amount of trapped mass that may be trapped within cylinder 135 and/or a combustion pressure of cylinder 135. As shown by a family of curves 207 in FIG. 3, a closing of intake valve 165 may be selectively varied during the intake and/or the compression strokes by any appropriate amount. When intake valve 165 is closed within the family of curves 207, intake valve 165 may be selectively advanced and/or retarded. When intake valve 165 is advanced within the family of curves 207 (i.e., the closing is adjusted to be further away from profile 201), less air/fuel mixture may be trapped within cylinder 135, resulting in a decrease in pressure rise-rate and/or pressure magnitude within cylinder 135. When intake valve 165 is retarded within the family of curves 207 (i.e., the closing is adjusted toward profile 201), more air/fuel mixture may be trapped within cylinder 135, resulting in an increase in pressure rise-rate and/or pressure magnitude within cylinder 135. Intake valve 165 may also be selectively varied during the intake and/or the compression strokes by any appropriate amount within a family of curves 209, shown in FIG. 3. When intake valve 165 is closed within the family of curves 209, the closing may be selectively advanced and/or retarded. When intake valve 165 is retarded within the family of curves 209 (i.e., the closing is adjusted to be further away from profile 201), less air/fuel mixture may be trapped within cylinder 135, resulting in a decrease in pressure rise-rate and/or pressure magnitude within cylinder 135. When intake valve 165 is advanced within the family of curves 209 (i.e., the closing is adjusted toward profile 201), more air/fuel mixture may be trapped within cylinder 135, resulting in an increase in pressure rise-rate and/or pressure magnitude within cylinder 135.

Varying the closing of intake valves 165 may affect an engine speed and torque of engine 105, similar to a throttle valve, but with a faster response than a throttle valve. For example, when the closing of intake valve 165 is advanced within the family of curves 207 or retarded within the family of curves 209, the amount of trapped mass within cylinders 135 may decrease (i.e., the amount of air/fuel mixture delivered to cylinders 135 may be decreased), which has a similar effect as decreasing an opening of a throttle valve to cylinders 135, but with a faster response time. The closing of intake valve 165 may thereby be adjusted away from a profile of intake valve 165 having a timing that has not been varied (i.e., away from unadjusted profile 201) when the engine speed is higher than desired. Because the amount of air/fuel mixture delivered to cylinders 135 is decreased via intake valves 165, there may be an instantaneous decrease in the engine speed of engine 105. An engine speed of engine 105 may thereby be substantially instantaneously reduced.

In contrast, when the closing of intake valve 165 is retarded within the family of curves 207 or advanced within the family of curves 209, the amount of trapped mass within cylinders 135 may increase (i.e., the amount of air/fuel mixture delivered to cylinders 135 may be increased), which has a similar effect as increasing an opening of a throttle valve to cylinders 135, but with a faster response time. The closing of intake valve 165 may thereby be adjusted toward a profile of intake valve 165 having a timing that has not been varied (i.e., toward unadjusted profile 201) when the engine speed of engine 105 is lower than desired. Because the amount of air/fuel mixture delivered to cylinders 135 is increased via intake valves 165, there may be an instantaneous increase in the engine speed of engine 105. An engine speed of engine 105 may thereby be substantially instantaneously increased.

It is contemplated that an opening of exhaust valve 170 may also or alternatively be advanced or retarded. As illustrated in FIG. 3, an opening of exhaust valve 170 may be selectively advanced or additionally opened during portions of the compression and/or power strokes. Because more air/fuel mixture may escape from cylinder 135 during the compression and/or power strokes when the opening of exhaust valve 170 is advanced or during an additional opening, the amount of trapped mass within cylinder 135 may decrease. The opening of exhaust valve 170 may also be selectively retarded during portions of the compression and/or power strokes. Because less air/fuel mixture may escape from cylinder 135 when the opening of exhaust valve 170 is retarded, the amount of trapped mass within cylinder 135 may increase.

Variable valve actuation system 110 may include a plurality of variable valve actuation devices 202 configured to adjust timings of intake valves 165 and/or exhaust valves 170 to adjust engine speed and torque. As shown in FIGS. 1 and 2, variable valve actuation device 202 may be attached to and/or enclosed by a valve housing 205 of engine 105. Each cylinder 135 may have an associated variable valve actuation device 202. Variable valve actuation device 202 may selectively adjust an opening timing, closing timing, and/or lift magnitude of intake valves 165 and/or exhaust valves 170. Variable valve actuation device 202 may be any suitable device for varying a valve timing such as, for example, a hydraulic, pneumatic, or mechanical device.

In one example, variable valve actuation device 202 may be operatively connected to rocker arm 180, intake valve 165, and/or exhaust valve 170 to selectively disconnect a movement of intake and/or exhaust valves 165, 170 from a movement of rocker arm 180. For example, variable valve actuation device 202 may be selectively operated to supply hydraulic fluid, for example, at a low or a high pressure, in a manner to resist closing of intake and/or exhaust valves 165, 170. That is, after valve actuation assembly 175 is no longer holding intake valve 165 and/or exhaust valve 170 open, the hydraulic fluid in variable valve actuation device 202 may hold intake valve 165 and/or exhaust valve 170 open for a desired period. Similarly, the hydraulic fluid may be used to advance a closing of intake valve 165 and/or exhaust valve 170 so that intake valve 165 and/or exhaust valve 170 closes earlier than the timing affected by valve actuation assembly 175. Alternatively, intake and/or exhaust valves 165, 170 may be moved solely by variable valve actuation device 202 without the use of cams and/or rocker arms, if desired.

Variable valve actuation device 202 may selectively advance or retard a closing of intake and/or exhaust valves 165, 170 during the different strokes of engine 105. Intake valve 165 may be closed early, for example, at a crank angle of between about 180° and about 210°. Control system 125 may also control variable valve actuation device 202 to retard a closing of intake valve 165. Intake valve 165 may be closed, for example, at a crank angle of between about 210° and about 300°. Exhaust valve 170 may be varied to open at a crank angle of between about 510° and about 570° and may be varied to close at a crank angle of between about 700° and about 60°. Exhaust valve 170 may also be opened at a crank angle of about 330° and closed at a crank angle of about 390°. Control system 125 may control each variable valve actuation device 202 to vary the valve timing of each cylinder 135 independently of the valve timing of any other cylinder 135. Control system 125 may thereby independently control a throttling of each cylinder 135 solely by varying a timing of intake valves 165 and/or exhaust valves 170.

Referring back to FIG. 2, intake system 115 may direct air and/or fuel into combustion chambers 160, and may include a single fuel injector 210, a compressor 215, and an intake manifold 220. Compressor 215 may compress and deliver an air/fuel mixture from fuel injector 210 to intake manifold 220.

Compressor 215 may draw ambient air into intake system 115 via a conduit 225, compress the air, and deliver the compressed air to intake manifold 220 via a conduit 230. This delivery of compressed air may help to overcome a natural limitation of combustion engines by eliminating an area of low pressure within cylinders 135 created by a downward stroke of pistons 140. Therefore, compressor 215 may increase the volumetric efficiency within cylinders 135, allowing more air/fuel mixture to be burned, resulting in a larger power output from engine 105. It is contemplated that a cooler for further increasing the density of the air/fuel mixture may be associated with compressor 215, if desired.

Fuel injector 210 may inject fuel at a low pressure into conduit 225, upstream of compressor 215, to form an air/fuel mixture. Fuel injector 210 may be selectively controlled by control system 125 to inject an amount of fuel into intake system 115 to substantially achieve a desired air-to-fuel ratio of the air/fuel mixture. Variable valve actuation device 202 may vary a timing of intake valves 165 and/or exhaust valves 170 to control an amount of air/fuel mixture that is delivered to cylinders 135.

Exhaust system 120 may direct exhaust gases from engine 105 to the atmosphere. Exhaust system 120 may include a turbine 235 connected to exhaust passages 163 of cylinder head 155 via a conduit 245. Exhaust gas flowing through turbine 235 may cause turbine 235 to rotate. Turbine 235 may then transfer this mechanical energy to drive compressor 215, where compressor 215 and turbine 235 form a turbocharger 250. In one embodiment, turbine 235 may include a variable geometry arrangement 255 such as, for example, variable position vanes or a movable nozzle ring. Variable geometry arrangement 255 may be adjusted to affect the pressure of air/fuel mixture delivered by compressor 215 to intake manifold 220. Turbine 235 may be connected to an exhaust outlet via a conduit 260. It is also contemplated that turbocharger 250 may be replaced by any other suitable forced induction system known in the art such as, for example, a supercharger, if desired.

Control system 125 may include a controller 270 configured to control the function of the various components of engine system 100 in response to input from one or more sensors 272. Sensors of control system 125 may measure engine parameters such as, for example, engine load, torque, and speed. Engine speed may be measured by any method known in the art such as, for example, by mechanically measuring a rotation of one or more engine components. Sensors 272 may also be configured to monitor an engine parameter indicative of a pressure within cylinders 135 (i.e., robustness, pressure, and/or temperature of a combustion event).

Based on the signals, controller 270 may determine an engine parameter such as, for example, an engine speed of engine 105. Controller 270 may compare the engine speed signals to a desired engine speed. The desired engine speed may be a predetermined value such as, for example, a value based on an engine mapping of engine 105 and/or operator input. The desired values may be stored within a map of controller 270. Based on a comparison of the measured engine speed with the desired engine speed, controller 270 may make adjustments to the timings of valves 165, 170.

The desired engine speed may be determined so as to maintain a constant speed and load response during an operation of genset 10. For example, the desired engine speed may be such that a tight engine speed control is maintained during power generation by genset 10. If an engine speed is detected that deviates from the desired engine speed, control system 125 may make adjustments to the timings of valves 165, 170 to maintain the desired engine speed (i.e., to hold constant speed during power generation).

Controller 270 may be any type of programmable logic controller known in the art for automating machine processes, such as a switch, a process logic controller, or a digital circuit. Controller 270 may serve to control the various components of engine system 100. Controller 270 may be electrically connected to the plurality of variable valve actuation devices 202 via a plurality of electrical lines 275. Controller 270 may also be electrically connected to the plurality of sensors 272 via a plurality of electrical lines 280. Controller 270 may be electrically connected to variable geometry arrangement 255 via an electrical line 285. It is also contemplated that controller 270 may be electrically connected to additional components and sensors of engine system 100 such as, for example, an actuator of fuel injector 210, if desired.

Controller 270 may include input arrangements that allow it to monitor signals from the various components of engine system 100 such as sensors 272. Controller 270 may rely upon digital or analog processing of input received from components of engine system 100 such as, for example, sensors 272 and an operator interface. Controller 270 may utilize the input to create output for controlling engine system 100. Controller 270 may include output arrangements that allow it to send output commands to the various components of engine system 100 such as variable valve actuation devices 202, variable geometry arrangement 255, fuel injector 210, and/or an operator interface.

Controller 270 may have stored in memory one or more engine maps and/or algorithms. Controller 270 may include one or more maps stored within an internal memory, and may reference these maps to determine a required change in engine operation, a modification of an engine parameter (e.g., engine speed or torque) required to affect the required change in engine operation, and/or a capacity of engine 105 for the modification. Each of these maps may include a collection of data in the form of tables, graphs, and/or equations.

Controller 270 may have stored in memory algorithms associated with determining required changes in engine operation based on engine parameters such as, for example, engine speed. For example, controller 270 may include an algorithm that performs a statistical analysis of the engine speed of engine 105 from combustion cycle to combustion cycle. Based on input received from sensors 272, the algorithm may determine information such as, for example, engine speed averages or statistical deviations of engine speed.

INDUSTRIAL APPLICABILITY

The disclosed engine control system may be used in any machine having a combustion engine where consistent operation thereof is a requirement. For example, the engine control system may be particularly applicable to gaseous-fuel driven engines utilized in electrical power generation applications. Operation of genset 10 will now be described.

During normal combustion events, pistons 140 may move through the four strokes of the combustion cycle. The movement of pistons 140 may drive the actuation of intake valves 165 and exhaust valves 170 via valve actuation assembly 175.

When controller 270 receives signals indicative of an engine speed that is higher than a desired engine speed, the valve timing of intake valve 165 may be adjusted to substantially instantaneously decrease an amount of air/fuel mixture delivered to cylinders 135. Controller 270 may compare the engine speed signals to the desired engine speed and determine that the amount of air/fuel mixture delivered to cylinders 135 is required to be decreased. Controller 270 may advance the closing of intake valve 165 within the family of curves 207 or retard the closing of intake valve 165 within the family of curves 209. This may decrease the amount of trapped mass within cylinders 135, which has the effect of decreasing an opening of a throttle valve to cylinders 135, but with a faster response than a throttle valve. The closing of intake valve 165 may thereby be adjusted away from a profile of intake valve 165 having a timing that has not been varied (i.e., away from unadjusted profile 201). Because an amount of air/fuel mixture delivered to cylinders 135 is decreased, there may be an instantaneous decrease in the engine speed of engine 105. Controller 270 may thereby adjust a valve timing to control an amount of air/fuel mixture delivered to cylinders 135.

When controller 270 receives signals indicative of an engine speed that is lower than a desired engine speed, the valve timing of intake valve 165 may be adjusted to substantially instantaneously increase an amount of air/fuel mixture delivered to cylinders 135. Controller 270 may compare the engine speed signals to the desired engine speed and determine that the amount of air/fuel mixture delivered to cylinders 135 is required to be increased. Controller 270 may retard the closing of intake valve 165 within the family of curves 207 or advance the closing of intake valve 165 within the family of curves 209. This may increase the amount of trapped mass within cylinders 135, which has the effect of increasing an opening of a throttle valve to cylinders 135, but with a faster response than a throttle valve. The closing of intake valve 165 may thereby be adjusted toward a profile of intake valve 165 having a timing that has not been varied (i.e., toward unadjusted profile 201). Because an amount of air/fuel mixture delivered to cylinders 135 is increased, there may be an instantaneous increase in the engine speed of engine 105. Controller 270 may thereby adjust a valve timing to control an amount of air/fuel mixture delivered to cylinders 135.

By adjusting the valve timing of each cylinder 135, engine system 100 may improve a response for engine speed changes of engine 105. Because of the improved response, engine 105 may be operated closer to its load limit because less margin of error is required to protect engine components from significantly higher cylinder pressures caused by combustion pressure variations. Additionally, air flow to engine 105 may be regulated solely by varying valve timing, which may significantly reduce lag time associated with conventional throttling (e.g., using a conventional throttle valve) and allow engine parameters such as engine speed to be controlled more tightly.

It will be apparent to those skilled in the art that various modifications and variations can be made to the disclosed method. Other embodiments will be apparent to those skilled in the art from consideration of the specification and practice of the disclosed method and apparatus. It is intended that the specification and examples be considered as exemplary only, with a true scope being indicated by the following claims and their equivalents.

What is claimed is:

1. A control system for an engine having a cylinder, the control system comprising:
    an engine valve movable to regulate a fluid flow of the cylinder;
    an actuator associated with the engine valve; and
    a controller in communication with the actuator, the controller being configured to:
        receive a signal indicative of engine speed;
        compare the engine speed signal with a desired engine speed; and
        selectively regulate the actuator to adjust a timing of the engine valve to control the flow of fluid of the cylinder based on the comparison, the controller being configured to open and close the engine valve at least one time per combustion cycle.

2. The control system of claim 1, wherein the engine valve is an intake valve and the flow of fluid is an air/fuel mixture delivered to the cylinder.

3. The control system of claim 2, wherein the controller is configured to selectively adjust a valve closing toward an unadjusted profile when the engine speed signal is lower than the desired engine speed.

4. The control system of claim 3, wherein selectively adjusting the valve closing toward the unadjusted profile increases the amount of air/fuel mixture delivered to the cylinder.

5. The control system of claim 2, wherein the controller is configured to selectively adjust a valve closing away from an unadjusted profile when the engine speed signal is higher than the desired engine speed.

6. The control system of claim 5, wherein selectively adjusting the valve closing away from the unadjusted profile decreases the amount of air/fuel mixture delivered to the cylinder.

7. The control system of claim 1, further including a second cylinder, where a valve timing of the second cylinder is controlled independently of the first cylinder.

8. The control system of claim 1, wherein the engine valve is an exhaust valve.

9. The control system of claim 1, wherein all air flow to the engine is regulated solely by the engine valve.

10. A method for operating a genset comprising:
    regulating a fluid flow to a cylinder of an engine of the genset via a valve associated with the cylinder;
    receiving a signal indicative of engine speed;
    comparing the engine speed signal with a desired constant engine speed; and
    selectively regulating a timing of the valve to control an amount of air/fuel mixture delivered to the cylinder based on the comparison to maintain the engine speed at the desired constant engine speed, the valve opening and closing at least one time per combustion cycle.

11. The method of claim 10, wherein selectively adjusting the valve timing includes selectively adjusting intake valve timing.

12. The method of claim 11, wherein selectively adjusting intake valve timing includes adjusting the intake valve closing toward an unadjusted profile when the engine speed signal is lower than the desired engine speed.

13. The method of claim 12, wherein selectively adjusting the intake valve closing toward the unadjusted profile increases the amount of air/fuel mixture delivered to the cylinder.

14. The method of claim 11, wherein selectively adjusting intake valve timing includes adjusting the intake valve closing away from an unadjusted profile when the engine speed signal is higher than the desired engine speed.

15. The method of claim 14, wherein selectively adjusting the intake valve closing away from the unadjusted profile decreases the amount of air/fuel mixture delivered to the cylinder.

16. The method of claim 10, wherein all air flow to the engine is regulated solely by engine valve adjustments.

17. A genset, comprising:
    a generator configured to generate an electrical output; and
    an engine system having:
        an engine valve movable to regulate a fluid flow of an associated cylinder;
        an actuator associated with the engine valve; and
        a controller in communication with the actuator, the controller being configured to:
            receive a signal indicative of engine speed;
            compare the engine speed signal with a desired constant engine speed; and
            selectively regulate the actuator to adjust a timing of the engine valve to control an amount of air/fuel mixture delivered to the cylinder based on the comparison to maintain the engine speed at the desired constant engine speed, the controller being configured to open and close the engine valve at least one time per combustion cycle.

18. The genset of claim 17, wherein the engine valve is an intake valve.

19. The genset of claim 18, wherein the controller is configured to selectively adjust a valve closing toward an unadjusted profile when the engine speed signal is lower than the desired engine speed.

20. The genset of claim 18, wherein the controller is configured to selectively adjust a valve closing away from an unadjusted profile when the engine speed signal is higher than the desired engine speed.

* * * * *

UNITED STATES PATENT AND TRADEMARK OFFICE
CERTIFICATE OF CORRECTION

PATENT NO. : 8,113,173 B2
APPLICATION NO. : 12/292822
DATED : February 14, 2012
INVENTOR(S) : Willi et al.

Page 1 of 1

It is certified that error appears in the above-identified patent and that said Letters Patent is hereby corrected as shown below:

In the Claims

Column 9, line 23, in Claim 3, delete "claim 2 ," and insert -- claim 2, --.

Column 9, line 32, in Claim 5, delete "claim 2 ," and insert -- claim 2, --.

Column 9, line 47, in Claim 10, delete "genset" and insert -- genset, --.

Signed and Sealed this
Eighteenth Day of August, 2015

Michelle K. Lee
*Director of the United States Patent and Trademark Office*